UNITED STATES PATENT OFFICE.

MILLER EUGENE CONRAD, OF ATLANTIC, IOWA, ASSIGNOR TO CHARLES B. SCHOEN-MEHL, OF WATERBURY, CONNECTICUT.

VOLTAIC CELL.

1,262,019.  Specification of Letters Patent.  Patented Apr. 9, 1918.

No Drawing.  Application filed February 7, 1917. Serial No. 147,132.

*To all whom it may concern:*

Be it known that MILLER EUGENE CONRAD, a citizen of the United States, and resident of Atlantic, in the county of Cass and State of Iowa, has invented certain new and useful Improvements in Voltaic Cells, of which the following is a specification.

This invention relates to voltaic cells, and especially to an improved depolarizing cell and an improved negative element therefor, whereby the useful life of a cell is prolonged and the electromotive force is increased.

The accumulation of hydrogen-bubbles on the surface of a negative plate of a voltaic cell, known as "polarization" is doubly objectionable. It results in a diminution of the current, first, by diminishing the exposed area of the negative plate and so increasing the internal resistance of the cell, and, second, by its tendency to set up a "polarization-current" in the direction opposite to that of the cell, the hydrogen being more positive than the zinc or other positive plate.

In the cell of my invention polarization is prevented by the conversion of the hydrogen of polarization into arsin or arseniureted hydrogen ($H_3As$).

This action is most conveniently effected by using as a negative element an arsenid of one of the metals. The nascent hydrogen coming into contact with the arsenid readily unites with arsenic to form $H_3As$ which is immediately driven off.

In making my non-polarized element I have used oxids of several metals such as antimony, copper, lead and iron, but prefer the several oxids of iron for reasons of availability, of working very clean and giving a constant current, besides being cheap. The iron oxid, mixed with a sufficient quantity of pulverized arsenic preferably metallic arsenic is placed in a crucible and heated. The resulting arsenid would be $Fe_2OAs$, $Fe_2O_2As$, or $Fe_2O_3As$.

Regarding any chemical reaction in the cell, it appears to be immaterial how many equivalents of oxygen are retained in the arsenid, as the oxygen does not seem to be separated during voltaic action.

It is more than likely that one or even two equivalents of oxygen are driven off in union with arsenic in the form of the two oxids of arsenic during the formation of the arsenid, so that hereinafter I write it $Fe_2OAs$. These several compounds are collectively designated "oxyarsenids," by which term I means to cover any arsenid in which arsenic replaces any part of the oxygen.

My improved non-polarizing element may be used with advantage in connection with any of the electrolytes now in use in primary cells. The best results are obtained by use of zinc and arsenid of iron elements and dilute $H_2SO_4$, KHO, or NaHO as the electrolyte. Using KHO as the electrolyte the reactions are as follows:

$3Zn + 6KOH + 2Fe_2OAs =$

The hydrogen in its nascent state combines at once with the arsenic of the negative element to form $H_3As$. The cell is thus continually depolarized, so as to give a constant current. No perceptible local action exists.

A valuable feature of the invention is the fact that the arsenid element may be renewed by again treating it with arsenic as often as its previous supply of arsenic is exhausted without noticeable deterioration.

My invention is not limited to any or all of the applications herein described.

The depolarizing element may be in any suitable shape; such as a plate, rod, cylinder, or vessel; or it may be held in any suitable container.

One of the advantages of the treatment of iron oxid with arsenic, especially true in the case of red oxid, is that it becomes a better conductor, thus lessening the internal resistance of the cell.

The conductivity of metallic oxids, such as copper and lead and prepared according to my specification, is also appreciatively increased over that of the corresponding oxid.

The small amount of arsin generated during the operation of the battery is relatively small and readily mixes with the fresh air and is thus carried off by suitable ventilation.

What I claim as my invention, and desire to secure by Letters Patent, are the following new and novel features, substantially as set forth:

1. A negative electrode for use in a voltaic cell, composed of a metallic oxyarsenid.

2. A negative electrode for use in a voltaic cell, composed of an oxyarsenid of iron.

Signed at Atlantic, in the county of Cass and State of Iowa, this 27 day of January A. D., 1917.

MILLER EUGENE CONRAD.

Witnesses:
G. T. MARSH,
JAMES R. GIFFEN.

Copies of this patent may be obtained for five cents each, by addressing the "Commissioner of Patents, Washington, D. C."